United States Patent
Fujiwara et al.

(10) Patent No.: US 8,288,488 B2
(45) Date of Patent: Oct. 16, 2012

(54) PROCESS FOR PRODUCING SOLID CATALYST COMPONENT FOR OLEFIN POLYMERIZATION

(75) Inventors: Yasuki Fujiwara, Chiba (JP); Wataru Hirahata, Chiba (JP); Hirofumi Hamaki, Chiba (JP)

(73) Assignee: Sumitomo Chemical Company, Limited, Tokyo (JP)

(*) Notice: Subject to any disclaimer, the term of this patent is extended or adjusted under 35 U.S.C. 154(b) by 0 days.

(21) Appl. No.: 13/094,268

(22) Filed: Apr. 26, 2011

(65) Prior Publication Data

US 2011/0269929 A1   Nov. 3, 2011

(30) Foreign Application Priority Data

Apr. 28, 2010   (JP) ................... 2010-104107

(51) Int. Cl.
*C08F 4/42* (2006.01)
*C08F 4/60* (2006.01)

(52) U.S. Cl. ............... 526/125.6; 526/124.9; 502/104; 502/169; 502/171; 502/172

(58) Field of Classification Search ............... 526/125.6, 526/124.9; 502/104, 169, 171, 172
See application file for complete search history.

(56) References Cited

U.S. PATENT DOCUMENTS

| | | | |
|---|---|---|---|
| 4,983,561 A | 1/1991 | Sasaki et al. | |
| 5,041,403 A | 8/1991 | Nakajo et al. | |
| 6,015,867 A | 1/2000 | Fushimi et al. | |
| 6,395,667 B1 * | 5/2002 | Satoh ........................... | 502/116 |
| 7,141,634 B2 * | 11/2006 | Hosaka et al. .............. | 526/124.9 |

FOREIGN PATENT DOCUMENTS

| | | |
|---|---|---|
| JP | 01-319508 A | 12/1989 |
| JP | 02-289604 A | 11/1990 |
| JP | 08-143619 A | 6/1996 |

\* cited by examiner

*Primary Examiner* — Ling Choi
*Assistant Examiner* — Chun-Cheng Wang
(74) *Attorney, Agent, or Firm* — Panitch Schwarze Belisario & Nadel LLP

(57) ABSTRACT

The present invention aims at providing a process for producing a solid catalyst for olefin polymerization, the solid catalyst component being capable of providing a polymer having high stereoregularity when an α-olefin is polymerized; a process for producing a solid catalyst component, which is used for producing the solid catalyst; and a process for producing an olefin polymer using the solid catalyst. This object can be achieved by a process for producing a solid catalyst component (A), the process including a step of bringing a titanium compound (a), a magnesium compound (b) and an internal electron donor represented by Formula (I) into contact with each other:

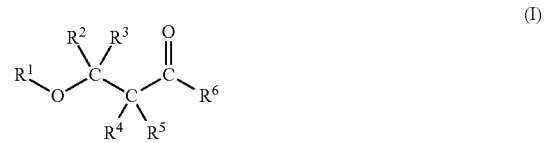

(I)

where $R^1$ is a hydrocarbyl group having 1 to 20 carbon atoms; $R^2$, $R^3$, $R^4$, and $R^5$ are each independently selected from a hydrogen atom, a halogen atom and a hydrocarbyl group having 1 to 20 carbon atoms, and at least one selected from $R^2$, $R^3$, $R^4$, and $R^5$ is a hydrocarbyl group having 1 to 20 carbon atoms; and $R^6$ is a halogen atom.

19 Claims, No Drawings

PROCESS FOR PRODUCING SOLID CATALYST COMPONENT FOR OLEFIN POLYMERIZATION

BACKGROUND OF THE INVENTION

1. Field of the Invention

The present application claims the Paris Convention priority based on Japanese Patent Application No. 2010-104107 filed on Apr. 28, 2010, the entire content of which is incorporated herein by reference.

The present invention relates to a process for producing a solid catalyst component for olefin polymerization; a process for producing a solid catalyst for olefin polymerization; and a process for producing an olefin polymer using the solid catalyst.

2. Description of the Related Art

Various solid catalyst components containing a titanium atom, a magnesium atom, a halogen atom and an internal electron donor have hitherto been proposed as a catalyst component for olefin polymerization. It is required for the catalyst obtained using such a solid catalyst component to give a polymer having a low content of a low molecular weight component or an amorphous component, when an olefin is polymerized in the presence of the catalyst. In the polymerization of an α-olefin, it is preferred that a resulting polymer has a high stereoregularity in addition to the low content of a low molecular weight component or an amorphous component therein. The stereoregularity of a polymer gives an influence on the crystallinity of the polymer, and a polymer having higher stereoregularity is higher in the degree of crystallization. A molded article comprising a polymer having a high crystallinity has superior rigidity and heat resistance.

For example, JP-A-1-319508 discloses that when an α-olefin is polymerized in the presence of a mixture of a Ti—Mg composite solid catalyst, which is obtained by reducing a tetravalent titanium compound with an organomagnesium compound in the presence of an organosilicon compound, an organoaluminum compound as a co-catalyst, and an organosilicon compound, an α-olefin polymer having a low content of a low molecular weight component or an amorphous component can be obtained.

JP-A-2-289604 and JP-A-8-143619 disclose a solid catalyst component, which is obtained by bringing a magnesium compound, a titanium compound, a halogen-containing compound and an alkoxyester compound into contact with each other, and a solid catalyst component, which is obtained by bringing a magnesium compound, a titanium compound and a halogen-containing compound into contact with each other, and then bringing the resulting mixture into contact with an alkoxyester compound.

SUMMARY OF THE INVENTION

The catalyst for olefin polymerization containing a solid catalyst component, however, is not satisfactory from the viewpoint of the stereoregularity of an olefin polymer obtained by polymerizing an olefin in the presence of the catalyst. The present invention aims at providing a process for producing a solid catalyst for olefin polymerization, the catalyst being capable of providing a polymer having high stereoregularity when an α-olefin is polymerized; a process for producing a solid catalyst component for olefin polymerization, which solid catalyst component is to be used for producing a solid catalyst for olefin polymerization; and a process for producing an olefin polymer using the solid catalyst.

The present invention provides a process for producing a solid catalyst component (A) for olefin polymerization, the process comprising a step of bringing a titanium compound (a), a magnesium compound (b) and an internal electron donor represented by Formula (I) into contact with each other:

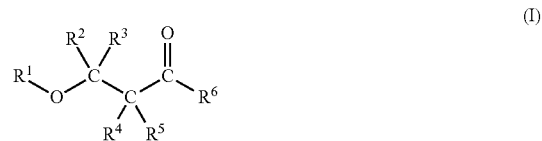

where $R^1$ is a hydrocarbyl group having 1 to 20 carbon atoms; $R^2$, $R^3$, $R^4$, and $R^5$ are each independently selected from a hydrogen atom, a halogen atom and a hydrocarbyl group having 1 to 20 carbon atoms, and at least one selected from $R^2$, $R^3$, $R^4$, and $R^5$ is a hydrocarbyl group having 1 to 20 carbon atoms; and $R^6$ is a halogen atom.

The present invention further provides a process for producing a solid catalyst for olefin polymerization, the process comprising a step of bringing the solid catalyst component (A) produced by the above process into contact with an organoaluminum compound (B).

The present invention further provides a process for producing an olefin polymer, the process comprising a step of polymerizing an olefin in the presence of a solid catalyst produced by the above process.

That is, the present invention provides the following.

(1) A process for producing a solid catalyst component (A) for olefin polymerization, the process comprising a step of bringing a titanium compound (a), a magnesium compound (b) and an internal electron donor represented by Formula (I) into contact with each other,

where $R^1$ is a hydrocarbyl group having 1 to 20 carbon atoms; $R^2$, $R^3$, $R^4$ and $R^5$ are each independently selected from a hydrogen atom, a halogen atom and a hydrocarbyl group having 1 to 20 carbon atoms, and at least one selected from $R^2$, $R^3$, $R^4$ and $R^5$ is a hydrocarbyl group having 1 to 20 carbon atoms; $R^6$ is a halogen atom.

(2) A process for producing a solid catalyst component (A') for olefin polymerization, the process comprising a step of bringing a titanium compound (a), a magnesium compound (b) and an internal electron donor represented by Formula (I) into contact with each other to form a mixture, and

where $R^1$ is a hydrocarbyl group having 1 to 20 carbon atoms; $R^2$, $R^3$, $R^4$ and $R^5$ are each independently selected from a hydrogen atom, a halogen atom and a hydrocarbyl group having 1 to 20 carbon atoms, and at least one selected from $R^2$, $R^3$, $R^4$ and $R^5$ is a hydrocarbyl group having 1 to 20 carbon atoms; $R^6$ is a halogen atom, a step of bringing an internal electron donor represented by Formula (II) into contact with the mixture,

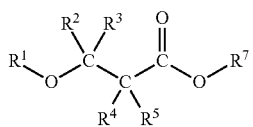

where $R^1$ and $R^7$ are each independently a hydrocarbyl group having 1 to 20 carbon atoms; $R^2$, $R^3$, $R^4$ and $R^5$ are each independently selected from a hydrogen atom, a halogen atom and a hydrocarbyl group having 1 to 20 carbon atoms, and at least one selected from $R^2$, $R^3$, $R^4$ and $R^5$ is a hydrocarbyl group having 1 to 20 carbon atoms.

(3) The process according to the item (1) or (2), wherein $R^2$ and $R^3$ are hydrogen atoms.

(4) The process according to any one of the items (1) to (3), wherein the magnesium compound (b) is a halogenated magnesium (b-1).

(5) The process according to any one of the items (1) to (3), wherein the magnesium compound (b) is a dialkoxy magnesium (b-2).

(6) The process according to any one of the items (1) to (5), wherein $R^4$ is an alkyl group having 1 to 20 carbon atoms or an aryl group having 6 to 20 carbon atoms.

(7) The process according to the item (6), wherein $R^4$ is a branched or a cyclic alkyl group having 3 to 20 carbon atoms, or an aryl group having 6 to 20 carbon atoms.

(8) A process for producing a solid catalyst for olefin polymerization, the process comprising a step of bringing the solid catalyst component (A) produced by the process according to any one of the items (1) and (3) to (7) or the solid catalyst component (A') produced by the process according to any one of the items (2) to (7) into contact with an organoaluminum compound (B).

(9) A process for producing a solid catalyst for olefin polymerization, the process comprising a step of bringing the solid catalyst component (A) produced by the process according to any one of the items (1) and (3) to (7) or the solid catalyst component (A') produced by the process according to any one of the items (2) to (7), an organoaluminum compound (B) and an external electron donor (C) into contact with each other.

(10) A process for producing an olefin polymer, the process comprising a step of polymerizing an olefin in the presence of a solid catalyst produced by the process according to the item (8) or (9).

(11) The process according to the item (10), wherein the olefin is an α-olefin having 3 to 20 carbon atoms.

According to the present invention, a process for producing a solid catalyst for olefin polymerization, the solid catalyst being capable of providing a polymer having high stereoregularity when an α-olefin is polymerized; a process for producing a solid catalyst component for olefin polymerization, which solid catalyst component is to be used for producing the solid catalyst for olefin polymerization; and a process for producing an olefin polymer using the solid catalyst can be provided.

DETAILED DESCRIPTION OF THE INVENTION

The process for producing a solid catalyst component (A) of the present invention for olefin polymerization comprises a step of bringing a titanium compound (a), a magnesium compound (b) and an internal electron donor represented by Formula (I) into contact with each other:

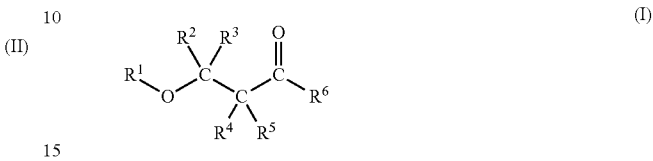

where $R^1$ is a hydrocarbyl group having 1 to 20 carbon atoms; $R^2$, $R^3$, $R^4$, and $R^5$ are each independently selected from a hydrogen atom, a halogen atom and a hydrocarbyl group having 1 to 20 carbon atoms, and at least one selected from $R^2$, $R^3$, $R^4$, and $R^5$ is a hydrocarbyl group having 1 to 20 carbon atoms; and $R^6$ is a halogen atom.

The titanium compound (a) may be any compound containing a titanium atom, and specific examples of the titanium compound include a titanium tetrahalide such as titanium tetrachloride, titanium tetrabromide, or titanium tetraiodide; tetrahydrocarbyloxytitanium such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium and tetraphenoxytitanium; a monoalkoxytitanium trihalide such as methoxytitanium trichloride, ethoxytitanium trichloride, n-propoxytitanium trichloride, n-butoxytitanium trichloride and ethoxytitanium tribromide; a dialkoxytitanium dihalide such as dimethoxytitanium dichloride, diethoxytitanium dichloride, diisopropoxytitanium dichloride, di-n-propoxytitanium dichloride and diethoxytitanium dibromide; and a trialkoxytitanium monohalide such as trimethoxytitanium chloride, triethoxytitanium chloride, triisopropoxytitanium chloride, tri-n-propoxytitanium chloride and tri-n-butoxytitanium chloride. Preferable the titanium compounds (a) include a titanium tetrahalide and a monoalkoxytitanium trihalide. A titanium tetrahalide is more preferable, and titanium tetrachloride is further preferable. The titanium compounds (a) may be used alone, or two or more compounds may be used in combination as the titanium compounds (a).

The magnesium compound (b) may be any compound containing a magnesium atom. Examples of the magnesium compound (b) include compounds represented by Formulae (i) and (ii).

where a is an integer number satisfying $0 \leq a \leq 2$; $R^7$ is a hydrocarbyl group having 1 to 20 carbon atoms; and $X^1$ is a halogen atom.

In Formulae (i) and (ii), examples of $R^7$ include an alkyl group, an aralkyl group, an aryl group, and an alkenyl group wherein a part or all of hydrogen atoms contained in these groups may be substituted by a halogen atom, a hydrocarbyloxy group, a nitro group, a sulfonyl group, a silyl group, or the like. Examples of the alkyl group as $R^7$ include linear alkyl groups such as a methyl group, an ethyl group, a n-propyl group, a n-butyl group, a n-pentyl group, a n-hexyl group, a n-heptyl group and a n-octyl group; branched alkyl groups such as an isopropyl group, an isobutyl group, a tert-butyl group, an isopentyl group, a neopentyl group and a 2-ethylhexyl group; and cyclic alkyl groups such as a cyclopropyl group, a cyclobutyl group, a cyclopentyl group, a cyclohexyl group, a cycloheptyl group and a cyclooctyl group. Linear or branched alkyl groups having 1 to 20 carbon atoms are preferable. Examples of the aralkyl group as $R^7$ include a benzyl group and a phenethyl group, and an aralkyl group having 7 to 20 carbon atoms is preferable. Examples of the aryl group as $R^7$ include a phenyl group, a naphthyl group, and a tolyl group, and an aryl group having 6 to 20 carbon atoms is preferable. Examples of the alkenyl group as $R^7$ include linear alkenyl groups such as a vinyl group, an allyl group, a 3-butenyl group and a 5-hexenyl group; branched alkenyl groups such as an isobutenyl group and a 4-methyl-3-pentenyl group; and cyclic alkenyl groups such as a 2-cyclohexenyl group and a 3-cyclohexenyl group. Linear or branched alkenyl groups having 2 to 20 carbon atoms are preferable. Multiple $R^7$s may be the same or different from each other.

In Formulae (i) and (ii), examples of $X^1$ include a chlorine atom, a bromine atom, an iodine atom and a fluorine atom, and a chlorine atom is preferable. Multiple $X^1$s may be the same or different from each other.

Specific examples of the magnesium compound (b) represented by Formula (i) or (ii) include dialkyl magnesium compounds such as dimethyl magnesium, diethyl magnesium, diisopropyl magnesium, dibutyl magnesium, dihexyl magnesium, dioctyl magnesium, ethylbutyl magnesium, dicyclohexyl magnesium and butyloctyl magnesium; dialkoxymagnesium compounds such as dimethoxymagnesium, diethoxymagnesium, dipropoxymagnesium, dibutoxymagnesium, dihexyloxymagnesium, dioctoxymagnesium and dicyclohexyloxymagnesium; alkyl magnesium halide compounds such as methyl magnesium chloride, ethyl magnesium chloride, isopropyl magnesium chloride, n-butyl magnesium chloride, t-butyl magnesium chloride, hexyl magnesium chloride, isobutyl magnesium chloride, benzyl magnesium chloride, methyl magnesium bromide, ethyl magnesium bromide, isopropyl magnesium bromide, n-butyl magnesium bromide, t-butyl magnesium bromide, hexyl magnesium bromide, isobutyl magnesium bromide, benzyl magnesium bromide, methyl magnesium iodide, ethyl magnesium iodide, isopropyl magnesium iodide, n-butyl magnesium iodide, t-butyl magnesium iodide, hexyl magnesium iodide, isobutyl magnesium iodide and benzyl magnesium iodide; alkoxymagnesium chloride such as methoxymagnesium chloride, ethoxymagnesium chloride, isopropoxymagnesium chloride, butoxymagnesium chloride and hexyloxymagnesium chloride; aryloxymagnesium chloride such as phenyloxymagnesium; and magnesium halide compounds such as magnesium fluoride, magnesium chloride, magnesium bromide and magnesium iodide.

Preferable the magnesium compounds (b) include a magnesium halide compound (b-1) and a dialkoxymagnesium compound (b-2). Preferable the magnesium halide compounds (b-1) include magnesium chlorid. Preferable the dialkoxymagnesium compounds (b-2) include dialkoxymagnesium having an alkyl group with 1 to 20 carbon atoms. Dialkoxymagnesium having an alkyl group with 1 to 10 carbon atoms is more preferable, and dimethoxymagnesium, diethoxymagnesium, dipropoxymagnesium, diisopropoxymagnesium and dibutoxymagnesium are particularly preferable. The magnesium compound (b) may be used in the state of a solution in which the magnesium compound (b) is dissolved in an alcohol solvent such as methanol, ethanol or 2-ethyl hexanol, or a hydrocarbon solvent such as toluene or hexane, or in the state of a solid, and may contain an alcohol, an ether, an ester, carbon dioxide, and the like.

As the magnesium halide compound (b-1), a commercially available product may be used as it is, or may be used a precipitate obtained by adding dropwise a solution of a commercially available product dissolved in an alcohol to a hydrocarbon liquid to form a precipitate and separating the precipitate from the liquid.

Examples of the process for producing the dialkoxymagnesium compound (b-2) include a process in which metal magnesium is brought into contact with an alcohol in the presence of a catalyst. Examples of the alcohol include methanol, ethanol, propanol, butanol and octanol. Examples of the catalyst include halogen catalysts such as iodine, chlorine and bromine; magnesium halide such as magnesium iodide or magnesium chloride, and iodine is preferable.

The magnesium compound (b) may be supported by a supporting material. Examples of the supporting material include porous bodies of inorganic oxides such as $SiO_2$, $Al_2O_3$, $MgO$, $TiO_2$ and $ZrO_2$; and porous bodies of organic polymers such as polystyrene, a styrene-divinylbenzene copolymer, a styrene-ethylene glycol-dimethacrylic acid copolymer, poly (methyl acrylate), poly (ethyl acrylate), a methyl acrylate-divinylbenzene copolymer, poly (methyl methacrylate), a methyl methacrylate-divinylbenzene copolymer, polyacrylonitrile, an acrylonitrile-divinylbenzene copolymer, polyvinyl chloride, polyethylene and polypropylene. Porous inorganic oxides are preferable, and $SiO_2$ is particularly preferable.

In order to effectively fix the precursor of the solid catalyst component on a supporting material, the supporting material has pores of from 20 to 200 nm in radius in a pore volume of preferably 0.3 $cm^3$/g or more, and more preferably 0.4 $cm^3$/g or more, and the pore volume of the pores of from 20 to 200 nm preferably account for 35% or more, more preferably 40% or more of the pore volume of pores of from 3.5 to 7500 nm in radius.

Examples of the hydrocarbyl group as $R^1$ in Formula (I) include an alkyl group, an aralkyl group, an aryl group, and an alkenyl group, wherein a part or all of hydrogen atoms in these groups may be substituted by a halogen atom, a hydrocarbyloxy group, a nitro group, a sulfonyl group, a silyl group, or the like. Examples of the alkyl group as $R^1$ include linear alkyl groups such as a methyl group, an ethyl group, a n-propyl group, a n-butyl group, a n-pentyl group, a n-hexyl group, a n-heptyl group and a n-octyl group; branched alkyl groups such as an isopropyl group, an isobutyl group, a tert-butyl group, an isopentyl group, a neopentyl group and a 2-ethylhexyl group; and cyclic alkyl groups such as a cyclopropyl group, a cyclobutyl group, a cyclopentyl group, a cyclohexyl group, a cycloheptyl group and a cyclooctyl group. Linear, branched or cyclic alkyl groups having 1 to 20 carbon atoms are preferable, and linear or branched alkyl groups having 1 to 20 carbon atoms are more preferable. Examples of the aralkyl group as $R^1$ include a benzyl group and a phenethyl group, and aralkyl groups having 7 to 20 carbon atoms are preferable. Examples of the aryl group as $R^1$ include a phenyl group, a tolyl group, and a xylyl group, and aryl groups having 6 to 20 carbon atoms are preferable. Examples of the alkenyl group as $R^1$ include linear alkenyl groups such as a vinyl group, an allyl group, a 3-butenyl group and a 5-hexenyl group; branched alkenyl groups such as an isobutenyl group and a 5-methyl-3-pentenyl group; and cyclic alkenyl groups such as a 2-cyclohexenyl group and a 3-cyclohexenyl group. Alkenyl groups having 2 to 20 carbon atoms are preferable.

$R^1$ in Formula (I) is preferably alkyl groups having 1 to 20 carbon atoms, more preferably linear or branched alkyl groups having 1 to 20 carbon atom, and particularly preferably a methyl group, an ethyl group, a n-propyl group, a n-butyl group, a n-pentyl group, a n-hexyl group, a n-heptyl group, a n-octyl group, an isopropyl group, an isobutyl group, a tert-butyl group, an isopentyl group, a neopentyl group and a 2-ethylhexyl group.

Examples of the halogen atom as $R^2$ to $R^5$ in Formula (I) include a fluorine atom, a chlorine atom, a bromine atom and an iodine atom, and a fluorine atom, a chlorine atom and a bromine atom are preferable.

Examples of the hydrocarbyl group as $R^2$ to $R^5$ in Formula (I) include an alkyl group, an aralkyl group, an aryl group, and an alkenyl group, in which a part or all of hydrogen atoms contained in the group may be substituted by a halogen atom, a hydrocarbyloxy group, a nitro group, a sulfonyl group, a silyl group, or the like. Examples of the alkyl group as $R^2$ to $R^5$ include linear alkyl groups such as a methyl group, an ethyl group, a n-propyl group, a n-butyl group, a n-pentyl group, a n-hexyl group, a n-heptyl group and a n-octyl group; branched alkyl groups such as an isopropyl group, an isobutyl group, a tert-butyl group, an isopentyl group, a neopentyl group, a 2-ethylhexyl group, a 1,1-dimethyl-2-methylpropyl group, a 1,1-dimethyl-2,2-dimethylpropyl group, a 1,1-dimethyl-n-butyl group, a 1,1-dimethyl-n-pentyl group and a 1,1-dimethyl-n-hexyl group; and cyclic alkyl groups such as a cyclopropyl group, a cyclobutyl group, a cyclopentyl group, a cyclohexyl group, a cycloheptyl group and a cyclooctyl group. Linear, branched and cyclic alkyl groups having 1 to 20 carbon atoms are preferable. Examples of the aralkyl group as $R^2$ to $R^5$ include a benzyl group and a phenethyl group, and aralkyl groups having 7 to 20 carbon atoms are preferable. Examples of the aryl group as $R^2$ to $R^5$ include a phenyl group, a tolyl group and a xylyl group, and aryl groups having 6 to 20 carbon atoms are preferable. Examples of the alkenyl group as $R^2$ to $R^5$ include linear alkenyl groups such as a vinyl group, an allyl group, a 3-butenyl group and a 5-hexenyl group; branched alkenyl groups such as an isobutenyl group and a 5-methyl-3-pentenyl group; and cyclic alkenyl groups such as a 2-cyclohexenyl group and a 3-cyclohexenyl group. Alkenyl groups having 2 to 10 carbon atoms are preferable.

$R^4$ in Formula (I) is preferably alkyl groups having 1 to 20 carbon atoms and aryl groups having 6 to 20 carbon atoms, more preferably branched or cyclic alkyl group having 3 to 20 carbon atoms and aryl groups having 6 to 20 carbon atoms, and branched alkyl groups such as an isopropyl group, an isobutyl group, a tert-butyl group, an isopentyl group, a neopentyl group, a 2-ethylhexyl group, a 1,1-dimethyl-2-methylpropyl group, a 1,1-dimethyl-2,2-dimethylpropyl group, a 1,1-dimethyl-n-butyl group, a 1,1-dimethyl-n-pentyl group and a 1,1-dimethyl-n-hexyl group; cyclic alkyl groups such as a cyclopropyl group, a cyclobutyl group, a cyclopentyl group, a cyclohexyl group, a cycloheptyl group and a cyclooctyl group; aryl groups such as a phenyl group, an o-tolyl group, a m-tolyl group, a p-tolyl group, a 2,6-dimethylphenyl group, a 2,4,6-trimethylphenyl group, an o-ethylphenyl group, a m-ethylphenyl group, a p-ethylphenyl group, a 2,6-diethylphenyl group, a 2,4,6-triethylphenyl group, a m-normalpropylphenyl group, and a m-isopropylphenyl group are further preferable, and branched alkyl groups such as an isopropyl group, an isobutyl group, a tert-butyl group, an isopentyl group, a neopentyl group, a 2-ethylhexyl group, a 1,1-dimethyl-2-methylpropyl group, a 1,1-dimethyl-2,2-dimethylpropyl group, a 1,1-dimethyl-n-butyl group, a 1,1-dimethyl-n-pentyl group and a 1,1-dimethyl-n-hexyl group; and aryl groups such as a phenyl group are particularly preferable.

$R^5$ in Formula (I) is preferably a hydrogen atom and an alkyl group having 1 to 20 carbon atoms, more preferably a hydrogen atom and a linear or branched alkyl group having 1 to 20 carbon atoms, and a hydrogen atom, linear alkyl groups such as a methyl group, an ethyl group, a n-propyl group, a n-butyl group, a n-pentyl group, a n-hexyl group, a n-heptyl group and a n-octyl group; branched alkyl groups such as an isopropyl group, an isobutyl group, a tert-butyl group, an isopentyl group, a neopentyl group, a 2-ethylhexyl group, a 1,1-dimethyl-2-methylpropyl group, a 1,1-dimethyl-2,2-dimethylpropyl group, a 1,1-dimethyl-n-butyl group, a 1,1-dimethyl-n-pentyl group and a 1,1-dimethyl-n-hexyl group are further preferable, a hydrogen atom and linear alkyl groups having 1 to 10 carbon atoms such as a methyl group, an ethyl group, a n-propyl group, a n-butyl group, a n-pentyl group, a n-hexyl group, a n-heptyl group and a n-octyl group are particularly preferable, and a hydrogen atom, a methyl group, an ethyl group, a n-propyl group, a n-butyl group and a n-pentyl group are most preferable.

$R^2$ and $R^3$ in Formula (I) are preferable a hydrogen atom and an alkyl group having 1 to 10 carbon atoms, more preferable a hydrogen atom and a linear alkyl group having 1 to 10 carbon atoms, and particularly preferable a hydrogen atom, a methyl group, an ethyl group, a n-propyl group, a n-butyl group and a n-pentyl group. A hydrogen atom is most preferable.

Examples of the halogen atom as $R^6$ in Formula (I) include a fluorine atom, a chlorine atom, a bromine atom and an iodine atom. A fluorine atom, a chlorine atom and a bromine atom are preferable, and a chlorine atom is more preferable.

Specific examples of Formula (I) include 3-ethoxy-2-isopropylpropionyl chloride, 3-ethoxy-2-tert-butylpropionyl chloride, 3-ethoxy-2-tert-amylpropionyl chloride, 3-ethoxy-2-cyclohexylpropionyl chloride, 3-ethoxy-2-cyclopentylpropionyl chloride, 3-ethoxy-2-adamantylpropionyl chloride, 3-ethoxy-2-phenylpropionyl chloride, 3-ethoxy-2-(2,3-dimethyl-2-butyl)propionyl chloride, 3-ethoxy-2-(2,3,3-trimethyl-2-butyl)propionyl chloride, 3-ethoxy-2-(2-methyl-2-hexyl)propionyl chloride, 3-isobutoxy-2-isopropylpropionyl chloride, 3-isobutoxy-2-isobutylpropionyl chloride, 3-isobutoxy-2-tert-butylpropionyl chloride, 3-isobutoxy-2-tert-amylpropionyl chloride, 3-isobutoxy-2-cyclohexylpropionyl chloride, 3-isobutoxy-2-cyclopentylpropionyl chloride, 3-isobutoxy-2-adamantylpropionyl chloride, 3-isobutoxy-2-phenylpropionyl chloride, 3-methoxy-2-isopropylpropionyl chloride, 3-methoxy-2-isobutylpropionyl chloride, 3-methoxy-2-tert-butylpropionyl chloride, 3-methoxy-2-tert-amylpropionyl chloride, 3-methoxy-2-cyclohexylpropionyl chloride, 3-methoxy-2-cyclopentylpropionyl chloride, 3-methoxy-2-adamantylpropionyl chloride, 3-methoxy-2-phenyl propionyl chloride, 3-methoxy-2-(2,3-dimethyl-2-butyl)propionyl chloride, 3-methoxy-2-(2,3,3-trimethyl-2-butyl)propionyl chloride, 3-methoxy-2-(2-methyl-2-hexyl)propionyl chloride, 3-ethoxy-3-isopropyl-2-isobutylpropionyl chloride, 3-ethoxy-3-isobutyl-2-isobutylpropionyl chloride, 3-ethoxy-3-isobutyl-2-tert-butylpropionyl chloride, 3-ethoxy-2,3-di-tert-butylpropionyl chloride, 3-ethoxy-3-isobutyl-2-tert-amylpropionyl chloride, 3-ethoxy-3-tert-butyl-2-tert-amylpropionyl chloride, 3-ethoxy-2,3-di-tert-amylpropionyl chloride, 3-ethoxy-3-isobutyl-2-cyclohexylpropionyl chloride, 3-ethoxy-2,3-dicyclohexylpropionyl chloride, 3-ethoxy-3-isobutyl-2-cyclopentylpropionyl chloride, 3-ethoxy-2,3-dicyclopentylpropionyl chloride, 3-methoxy-2,2-diisopropylpropionyl chloride, 3-ethoxy-2,2-diisopropylpropionyl chloride, 3-methoxy-2-isopropyl-2-isobutylpropionyl chloride, 3-ethoxy-2-isopropyl-2-isobutylpropionyl chloride, 3-methoxy-2-isopropyl-2-tert-butylpropionyl chloride, 3-ethoxy-2-isopropyl-2-tertbutylpropionyl chloride, 3-methoxy-2-isopropyl-2-tert-amylpropionyl chloride, 3-ethoxy-2-isopropyl-2-tert-amylpropionyl chloride, 3-methoxy-2-isopropyl-2-cyclopentylpropionyl chloride, 3-ethoxy-2-isopropyl-2-cyclopentylpropionyl chloride, 3-methoxy-2-isopropyl-2-cyclohexylpropionyl chloride, 3-ethoxy-2-isopropyl-2-cyclohexylpropionyl chloride, 3-methoxy-2-isopropyl-2-phenylpropionyl chloride, 3-ethoxy-2-isopropyl-2-phenylpropionyl chloride, 3-methoxy-2,2-diisobutylpropionyl chloride, 3-ethoxy-2,2-diisobutylpropionyl chloride, 3-methoxy-2-isobutyl-2-tert-butylpropionyl chloride, 3-ethoxy-2-isobutyl-2-tert-butylpropionyl chloride, 3-methoxy-2-isobutyl-2-tert-amylpropionyl chloride, 3-ethoxy-2-isobutyl-2-tert-amylpropionyl chloride, 3-methoxy-2-isobutyl-2-cyclopentylpropionyl chloride, 3-ethoxy-2-isobutyl-2-cyclopentylpropionyl chloride, 3-methoxy-2-isobutyl-2-cyclohexylpropionyl chloride, 3-ethoxy-2-isobutyl-2-cyclohexylpropionyl chloride, 3-methoxy-2-isobutyl-2-phenylpropionyl chloride, 3-ethoxy-2-isobutyl-2-phenylpropionyl chloride, 3-methoxy-2,2-di-tert-butylpropionyl chloride, 3-ethoxy-2,2-di-tert-butylpropionyl chloride, 3-methoxy-2-tert-butyl-2-methylpropionyl chloride, 3-ethoxy-2-tert-butyl-2-methylpropionyl chloride, 3-methoxy-2-tert-butyl-2-ethylpropionyl chloride, 3-ethoxy-2-tert-butyl-2-ethylpropionyl chloride, 3-methoxy-2-tert-butyl-2-n-propylpropionyl chloride, 3-ethoxy-2-tert-butyl-2-n-propylpropionyl chloride, 3-methoxy-2-tert-butyl-2-n-butylpropionyl chloride, 3-ethoxy-2-tert-butyl-2-n-butylpropionyl chloride, 3-methoxy-2-tert-butyl-2-n-pentylpropionyl chloride, 3-ethoxy-2-tert-butyl-2-n-pentylpropionyl chloride, 3-methoxy-2-tert-butyl-2-phenylpropionyl chloride, 3-ethoxy-2-tert-butyl-2-phenylpropionyl chloride, and 3-ethoxy-2,2-dicyclohexylpropionyl chloride.

Preferable are 3-ethoxy-2-tert-butylpropionyl chloride, 3-ethoxy-2-cyclohexylpropionyl chloride, 3-ethoxy-2-cyclopentylpropionyl chloride, 3-ethoxy-2-phenylpropionyl chloride, 3-methoxy-2-phenylpropionyl chloride, 3-ethoxy-2-(2,3-dimethyl-2-butyl)propionyl chloride, 3-ethoxy-2-(2,3,3-trimethyl-2-butyl)propionyl chloride, 3-ethoxy-2-(2-methyl-2-hexyl)propionyl chloride, 3-methoxy-2-tert-butylpropionyl chloride, 3-ethoxy-3-isobutyl-2-tert-butylpropionyl chloride, 3-ethoxy-2,3-di-tert-butylpropionyl chloride, 3-ethoxy-3-tert-butyl-2-tert-amylpropionyl chloride, 3-methoxy-2-isopropyl-2-tert-butylpropionyl chloride, 3-ethoxy-2-isopropyl-2-tert-butylpropionyl chloride, 3-methoxy-2-isobutyl-2-tert-butylpropionyl chloride, 3-ethoxy-2-isobutyl-2-tert-butylpropionyl chloride, 3-methoxy-2,2-di-tert-butylpropionyl chloride, 3-ethoxy-2,2-di-tert-butylpropionyl chloride, 3-methoxy-2-tert-butyl-2-methylpropionyl chloride, 3-ethoxy-2-tert-butyl-2-methylpropionyl chloride, 3-methoxy-2-tert-butyl-2-ethylpropionyl chloride, 3-ethoxy-2-tert-butyl-2-ethylpropionyl chloride, 3-methoxy-2-tert-butyl-2-n-propylpropionyl chloride, 3-ethoxy-2-tert-butyl-2-n-propylpropionyl chloride, 3-methoxy-2-tert-butyl-2-n-butylpropionyl chloride, 3-ethoxy-2-tert-butyl-2-n-butylpropionyl chloride, 3-methoxy-2-tert-butyl-2-n-pentylpropionyl chloride and 3-ethoxy-2-tert-butyl-2-n-pentylpropionyl chloride, and particularly preferable are 3-ethoxy-2-tert-butylpropionyl chloride, 3-ethoxy-2-phenylpropionyl chloride, 3-ethoxy-2-(2,3-dimethyl-2-butyl)propionyl chloride, 3-ethoxy-2-(2,3,3-trimethyl-2-butyl)propionyl chloride, 3-ethoxy-2-(2-methyl-2-hexyl)propionyl chloride, 3-ethoxy-3-isobutyl-2-tert-butylpropionyl chloride, 3-ethoxy-3-tert-butyl-2-tert-amylpropionyl chloride, 3-ethoxy-2-isopropyl-2-tert-butylpropionyl chloride, 3-ethoxy-2-isobutyl-2-tert-butylpropionyl chloride, 3-ethoxy-2-tert-butyl-2-methylpropionyl chloride, 3-ethoxy-2-tert-butyl-2-ethylpropionyl chloride, 3-ethoxy-2-tert-butyl-2-n-propylpropionyl chloride, 3-ethoxy-2-tert-butyl-2-n-butylpropionyl chloride, and 3-methoxy-2-tert-butyl-2-n-pentylpropionyl chloride.

In the present invention, the titanium compound (a) is used usually in an amount of from 0.01 mol to 100 mol, preferably from 0.03 mol to 50 mol, particularly preferably from 0.05 mol to 30 mol per mole of the total magnesium atoms in the magnesium compound (b) used. The titanium compound (a) may be used all at once or in multiple batches.

In the present invention, the internal electron donor represented by Formula (I) is used usually in an amount of from 0.01 ml to 100 ml, preferably from 0.03 ml to 50 ml, particularly preferably from 0.05 ml to 3 ml per gram of the magnesium compound (b) used. The internal electron donor represented by Formula (I) may be used all at once or in multiple batches.

In the present invention, the titanium compound (a), the magnesium compound (b) and the internal electron donor represented by Formula (I) (hereinafter may be referred to as the "internal electron donor (I)") are usually wholly brought into contact with each other under an atmosphere of an inert gas such as a nitrogen gas or an argon gas. Examples of the process for producing the solid catalyst component (A) by bringing them into contact with each other include the following processes:

(1-1) a process in which the titanium compound and the internal electron donor (I) are added to the magnesium compound in an arbitrary order to produce a solid component;

(1-2) a process in which a mixture of the titanium compound and the internal electron donor (I) is added to the magnesium compound to produce a solid component;

(1-3) a process in which the internal electron donor (I) is added to the magnesium compound and further the titanium compound is added to produce a solid component;

(1-4) a process in which the internal electron donor (I) is added to the magnesium compound and further the titanium compound and the internal electron donor (I) are added in an arbitrary order to produce a solid component;

(1-5) a process in which the internal electron donor (I) is added to the magnesium compound and further a mixture of the titanium compound and the internal electron donor (I) is added to produce a solid component;

(1-6) a process in which the magnesium compound and the internal electron donor (I) are added to the titanium compound in an arbitrary order to produce a solid component; and (1-7) a process in which a mixture of the magnesium compound and the internal electron donor (I) is added to the titanium compound to produce a solid component.

The solid component obtained by any of processes (1-1) to (1-7) can be used as the solid catalyst component (A). Preferable process is (1-1) or (1-2).

A solid component obtained by adding the titanium compound, once or more times, to the solid component obtained by any of processes (1-1) to (1-7), and a solid component obtained by adding the titanium compound and, the internal electron donor (I) or an internal electron donor (II), once or more times in an arbitrary order, to the solid component obtained by any of processes (1-1) to (1-7) or a solid component obtained by adding a mixture of the titanium compound and, the internal electron donor (I) or an internal electron donor (II), once or more times, to the solid component which has been obtained by any of processes (1-1) to (1-7), can also be used as the solid catalyst component (A).

A compound obtained by the following process also can be preferably used as a solid catalyst component.

The process comprises a step of bringing a titanium compound (a), a magnesium compound (b) and an internal electron donor represented by Formula (I) into contact with each other to form a mixture, and

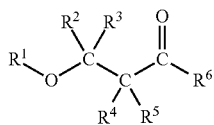

where $R^1$ is a hydrocarbyl group having 1 to 20 carbon atoms; $R^2$, $R^3$, $R^4$ and $R^5$ are each independently selected from a hydrogen atom, a halogen atom and a hydrocarbyl group having 1 to 20 carbon atoms, and at least one selected from $R^2$, $R^3$, $R^4$ and $R^5$ is a hydrocarbyl group having 1 to 20 carbon atoms; $R^6$ is a halogen atom, a step of bringing an internal electron donor represented by Formula (II) into contact with the mixture,

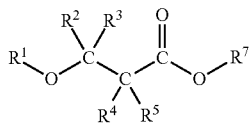

where $R^1$ and $R^7$ are each independently a hydrocarbyl group having 1 to 20 carbon atoms; $R^2$, $R^3$, $R^4$ and $R^5$ are each independently selected from a hydrogen atom, a halogen atom and a hydrocarbyl group having 1 to 20 carbon atoms, and at least one selected from $R^2$, $R^3$, $R^4$ and $R^5$ is a hydrocarbyl group having 1 to 20 carbon atoms A compound obtained by the above-mentioned process may be referred to as a solid catalyst component (A').

In the above-mentioned process, each component of a titanium compound (a), a magnesium compound (b) and an internal electron donor represented by Formula (I) is the same component as a titanium compound (a), a magnesium compound (b) and an internal electron donor represented by Formula (I) in the process for producing a solid catalyst component (A).

The following processes for producing a solid catalyst component (A) or a solid catalyst component (A') are particularly preferred.

A process for producing the solid component in which the titanium compound, and the internal electron donor (I) or the internal electron donor (II) each are added separately to the solid component obtained by any one of processes (1-1) to (1-7) once or more times, preferably twice to five times.

A process for producing the solid component in which a mixture of the titanium compound, and the internal electron donor (I) or the internal electron donor (II) is added to the solid component obtained by any one of processes (1-1) to (1-7) once or more times, preferably twice to five times. Preferable process is a process for producing the solid component in which a mixture of the titanium compound and the internal electron donor (II) is added to the solid component obtained by processes (1-1) or (1-2).

The internal electron donor (II) is an alkoxyester compound represented by Formula (II)

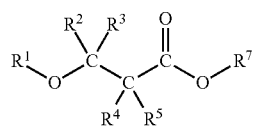

where $R^1$ and $R^7$ are each independently a hydrocarbyl group having 1 to 20 carbon atoms; $R^2$, $R^3$, $R^4$ and $R^5$ are each independently selected from a hydrogen atom, a halogen atom and a hydrocarbyl group having 1 to 20 carbon atoms, and at least one selected from $R^2$, $R^3$, $R^4$ and $R^5$ is a hydrocarbyl group having 1 to 20 carbon atoms.

The alkoxyester compound is preferably ethyl 3-ethoxy-2-isopropylpropionate, ethyl 3-ethoxy-2-isobutylpropionate, ethyl 3-ethoxy-2-tert-butylpropionate, ethyl 3-ethoxy-2-tert-amylpropionate, ethyl 3-ethoxy-2-cyclohexylpropionate, ethyl 3-ethoxy-2-cyclopentylpropionate, ethyl 3-ethoxy-2-phenylpropionate, ethyl 3-methoxy-2-isopropylpropionate, ethyl 3-methoxy-2-isobutylpropionate, ethyl 3-methoxy-2-tert-butylpropionate, ethyl 3-methoxy-2-tert-amylpropionate, ethyl 3-methoxy-2-cyclohexylpropionate, ethyl 3-methoxy-2-cyclopentylpropionate, ethyl 3-methoxy-2-phenylpropionate, methyl 3-ethoxy-2-isopropylpropionate, methyl 3-ethoxy-2-isobutylpropionate, methyl 3-ethoxy-2-tert-butylpropionate, methyl 3-ethoxy-2-tert-amylpropionate, methyl 3-ethoxy-2-cyclohexylpropionate, methyl 3-ethoxy-2-cyclopentylpropionate, methyl 3-ethoxy-2-phenylpropionate, methyl 3-methoxy-2-isopropylpropionate, methyl 3-methoxy-2-isobutylpropionate, methyl 3-methoxy-2-tert-butylpropionate, methyl 3-methoxy-2-tert-amylpropionate, methyl 3-methoxy-2-cyclohexylpropionate, methyl 3-methoxy-2-cyclopentylpropionate, methyl 3-methoxy-2-phenylpropionate, ethyl 3-methoxy-2,2-diisopropylpropionate, methyl 3-methoxy-2,2-diisopropylpropionate, ethyl 3-ethoxy-2,2-diisopropylpropionate, methyl 3-ethoxy-2,2-diisopropylpropionate, ethyl 3-ethoxy-2,2-diphenylpropionate, methyl 3-ethoxy-2,2-diphenylpropionate, ethyl 3-methoxy-2,2-diisobutylpropionate, methyl 3-methoxy-2,2-diisobutylpropionate, ethyl 3-ethoxy-2,2-diisobutylpropionate, methyl 3-ethoxy-2,2-diisobutylpropionate, ethyl 3-methoxy-2,2-di-tert-butylpropionate, methyl 3-methoxy-2,2-di-tert-butylpropionate, ethyl 3-ethoxy-2,2-di-tert-butylpropionate, methyl 3-ethoxy-2,2-di-tert-butylpropionate, ethyl 3-ethoxy-2,2-dicyclohexylpropionate, or ethyl 3-ethoxy-2,2-dicyclopentylpropionate.

The alkoxyester represented by Formula (II) is used usually in an amount of from 0.01 ml to 100 ml, preferably from 0.03 ml to 50 ml, particularly preferably from 0.05 ml to 3 ml per gram of the magnesium compound (b) used. The alkoxyester represented by Formula (II) may be used all at once or in multiple batches.

The process for bringing the components into contact with each other is not particularly limited. Examples of the process include publicly known processes such as a slurry process and a mechanical pulverization process (for example, a process of pulverizing the compounds using a ball mill).

The slurry concentrations in the slurry process is usually from 0.05 to 0.7 g-solid/ml-solvent, particularly preferably from 0.1 to 0.5 g-solid/ml-solvent. The contact temperature is usually from 30° C. to 150° C., preferably from 45° C. to 135°

C., particularly preferably from 60° C. to 120° C. The contact time is usually preferably from about 30 minutes to about 6 hours.

In order to decrease the content of a fine powder in a resulting solid catalyst component or inhibit the particle size distribution of the solid catalyst component from broadening, the mechanical pulverization process is preferably performed in the presence of a solvent. Examples of the solvent include aliphatic hydrocarbons such as pentane, hexane, heptane and octane; aromatic hydrocarbons such as benzene, toluene and xylene; alicyclic hydrocarbons such as cyclohexane and cyclopentane; and halogenated hydrocarbons such as 1,2-dichloroethane and monochlorobenzene. Aromatic hydrocarbons and halogenated hydrocarbons are preferable.

In the mechanical pulverization process, the temperature at which the titanium compound (a), the magnesium compound (b) and the internal electron donor represented by Formula (I) are brought into contact with each other is usually within a range of −50° C. to 200° C., preferably −20° C. to 150° C., more preferably −20° C. to 130° C., particularly preferably −20° C. to 120° C.

In the mechanical pulverization process, the time during which the titanium compound (a), the magnesium compound (b) and the internal electron donor represented by Formula (I) are brought into contact with each other is usually from 10 minutes to 12 hours, preferably from 30 minutes to 10 hours, particularly preferably from 1 hour to 8 hours. These compounds may be brought into contact with each other for a prescribed contact time, or they may be brought into contact with each other for a time less than the prescribed contact time to form a precursor, then the precursor may be washed and maintained as it is for the rest of the prescribed contact time, thereby forming a solid catalyst component.

In the present invention, the titanium compound (a), the magnesium compound (b) and the internal electron donor represented by Formula (I) and optionally the internal electron donor represented by Formula (II) are brought into contact with each other at a temperature within a range of usually −50° C. to 200° C., preferably 0° C. to 170° C., particularly preferably 50° C. to 150° C.

In the present invention, the time during which the titanium compound (a), the magnesium compound (b), the internal electron donor represented by Formula (I) and optionally the internal electron donor represented by Formula (II) are brought into contact with each other is usually from 10 minutes to 12 hours, preferably from 30 minutes to 10 hours, particularly preferably from 30 minutes to 8 hours.

It is preferable to wash the solid catalyst component, obtained by bringing the titanium compound (a), the magnesium compound (b), the internal electron donor represented by Formula (I) and optionally the internal electron donor represented by Formula (II) into contact with each other, or a precursor formed during the step of forming the solid catalyst component with a solvent, in order to remove undesired substances. A solvent inert to the precursor and the solid catalyst component is preferable as the solvent, and examples of the solvent include aliphatic hydrocarbons such as pentane, hexane, heptane and octane; aromatic hydrocarbons such as benzene, toluene and xylene; alicyclic hydrocarbons such as cyclohexane and cyclopentane; and halogenated hydrocarbons such as 1,2-dichloroethane and monochlorobenzene. Aromatic hydrocarbons and halogenated hydrocarbons are particularly preferable. The amount of the solvent to be used for washing the solid catalyst component is usually from 0.1 ml to 1000 ml, preferably from 1 ml to 100 ml per gram of the solid catalyst component or the precursor in one stage of contact. Washing is usually performed once to five times in each stage of contact. The washing temperature is usually from −50 to 150° C., preferably from 0 to 140° C., more preferably from 60 to 135° C. The washing time is preferably from 1 to 120 minutes, more preferably from 2 to 60 minutes.

The solid catalyst component (A) or the solid catalyst component (A') of the present invention and the organoaluminum compound (B) are brought into contact with each other by a publicly known process to produce the solid catalyst for olefin polymerization. It is also possible to produce the solid catalyst by bringing the solid catalyst component (A) or the solid catalyst component (A') of the present invention, the organoaluminum compound (B), and the external electron donor (C) into contact with each other.

Examples of the organoaluminum compound (B) to be used in the present invention include compounds described in JP-A-10-212319. Trialkyl aluminum, a mixture of trialkyl aluminum and a dialkyl aluminum halide, and alkyl alumoxane are preferable; and triethyl aluminum, triisobutyl aluminum, a mixture of triethyl aluminum and diethyl aluminum chloride, and tetraethyl dialumoxane are more preferable.

Examples of the external electron donor (C) optionally to be used in the present invention include compounds described in JP-B-2950168, JP-A-2006-96936, JP-A-2009-173870, and JP-A-2010-168545. Oxygen-containing compounds and nitrogen-containing compounds are preferable. Examples of the oxygen-containing compound include alkoxysilicon, ethers, esters, and ketones. Alkoxysilicon and ethers are preferable.

Compounds represented by any of Formulae (iv) to (vi) are preferable as the alkoxysilicon for the external electron donor (C):

  (iv)

  (v)

  (vi)

where $R^9$ is a hydrocarbyl group having 1 to 20 carbon atoms or a hydrogen atom; $R^{10}$ is a hydrocarbyl group having 1 to 20 carbon atoms; and h is an integer number satisfying $0 \leq h < 4$. When there are multiple $R^9$s, the $R^9$s may be the same as or different from each other. When there are multiple $R^{10}$s, the $R^{10}$s may be the same as or different from each other. $R^{11}$ is a hydrocarbyl group having 1 to 6 carbon atoms; each of $R^{12}$ and $R^{13}$ is a hydrogen atom or a hydrocarbyl group having 1 to 12 carbon atoms; and $NR^{14}$ is a cyclic amino group having 5 to 20 carbon atoms.

In Formula (iv), examples of the hydrocarbyl group as $R^9$ and $R^{10}$ include an alkyl group, an aralkyl group, an aryl group, and an alkenyl group. Examples of the alkyl group as $R^9$ and $R^{10}$ include linear alkyl groups such as a methyl group, an ethyl group, a n-propyl group, a n-butyl group, a n-pentyl group, a n-hexyl group, a n-heptyl group and a n-octyl group; branched alkyl groups such as an isopropyl group, an isobutyl group, a tert-butyl group, an isopentyl group, a neopentyl group and a 2-ethylhexyl group; and cyclic alkyl groups such as a cyclopropyl group, a cyclobutyl group, a cyclopentyl group, a cyclohexyl group, a cycloheptyl group and a cyclooctyl group. Linear, branched or cyclic alkyl groups having 1 to 20 carbon atoms are preferable. Examples of the aralkyl group as $R^9$ and $R^{10}$ include a benzyl group and a phenethyl group, and aralkyl groups having 7 to 20 carbon atoms are preferable. Examples of the aryl group as $R^9$ and $R^{10}$ include a phenyl group, a tolyl group and a xylyl group, and aryl groups having 6 to 20 carbon atoms are preferable. Examples of the alkenyl group as $R^9$ and $R^{10}$ include linear alkenyl groups such as a vinyl group, an allyl group, a 3-butenyl group and a 5-hexenyl group; branched alkenyl groups such as an isobutenyl group and a 5-methyl-3-pentenyl group; and cyclic alkenyl groups such as a 2-cyclohexenyl group and a 3-cyclohexenyl group. Alkenyl groups having 2 to 10 carbon atoms are preferable.

Examples of the alkoxysilicon represented by Formula (iv) include cyclohexylmethyldimethoxysilane, cyclohexylethyldimethoxysilane, diisopropyldimethoxysilane, tert-butylethyldimethoxysilane, tert-butyl-n-propyldimethoxysilane, phenyltrimethoxysilane, diphenyldimethoxysilane, dicyclobutyldimethoxysilane, dicyclopentyldimethoxysilane, tetraethoxysilane, methyltriethoxysilane, ethyltriethoxysilane, isobutyltriethoxysilane, vinyltriethoxysilane, sec-butyltriethoxysilane, cyclohexyltriethoxysilane, and cyclopentyltriethoxysilane.

Examples of the hydrocarbyl group as $R^{11}$ in Formulae (v) and (vi) include an alkyl group and an alkenyl group. Examples of the alkyl group as $R^{11}$ include linear alkyl groups such as a methyl group, an ethyl group, a n-propyl group, a n-butyl group, a n-pentyl group and a n-hexyl group; branched alkyl groups such as an isopropyl group, an isobutyl group, a tert-butyl group, an isopentyl group and a neopentyl group; and cyclic alkyl groups such as a cyclopropyl group, a cyclobutyl group, a cyclopentyl group and a cyclohexyl group. Linear alkyl groups having 1 to 6 carbon atoms are preferable. Examples of the alkenyl group as $R^{11}$ include linear alkenyl groups such as a vinyl group, an allyl group, a 3-butenyl group and a 5-hexenyl group; branched alkenyl groups such as an isobutenyl group and a 5-methyl-3-pentenyl group; and cyclic alkenyl groups such as a 2-cyclohexenyl group and a 3-cyclohexenyl group. Linear alkenyl groups having 2 to 6 carbon atoms are preferable, and a methyl group and an ethyl group are particularly preferable.

Examples of the hydrocarbyl group as $R^{12}$ and $R^{13}$ in Formula (v) include an alkyl group and an alkenyl group. Examples of the alkyl group as $R^{12}$ and $R^{13}$ include linear alkyl groups such as a methyl group, an ethyl group, a n-propyl group, a n-butyl group, a n-pentyl group and a n-hexyl group; branched alkyl groups such as an isopropyl group, an isobutyl group, a tert-butyl group, an isopentyl group and a neopentyl group; and cyclic alkyl groups such as a cyclopropyl group, a cyclobutyl group, a cyclopentyl group and a cyclohexyl group. Linear alkyl groups having 1 to 6 carbon atoms are preferable. Examples of the alkenyl group as $R^{12}$ and $R^{13}$ include linear alkenyl groups such as a vinyl group, an allyl group, a 3-butenyl group and a 5-hexenyl group; branched alkenyl groups such as an isobutenyl group and a 5-methyl-3-pentenyl group; and cyclic alkenyl groups such as a 2-cyclohexenyl group and a 3-cyclohexenyl group. Linear alkenyl groups having 2 to 6 carbon atoms are preferable, and a methyl group and an ethyl group are particularly preferable.

Specific examples of the alkoxysilicon represented by Formula (v) include dimethylaminotrimethoxysilane, diethylaminotrimethoxysilane, di-n-propylaminotrimethoxysilane, dimethylaminotriethoxysilane, diethylaminotriethoxysilane, di-n-propylaminotriethoxysilane, methylethylaminotriethoxysilane, methyl-n-propylaminotriethoxysilane, tert-butylaminotriethoxysilane, diisopropylaminotriethoxysilane, and methylisopropylaminotriethoxysilane.

Examples of the cyclic amino group as $NR^{14}$ in Formula (vi) include a perhydroquinolino group, a perhydroisoquinolino group, a 1,2,3,4-tetrahydroquinolino group, a 1,2,3,4-tetrahydroisoquinolino group, and an octamethyleneimino group.

Specific examples of the alkoxysilicon represented by Formula (vi) include perhydroquinolinotriethoxysilane, perhydroisoquinolinotriethoxysilane, 1,2,3,4-tetrahydroquinolinotriethoxysilane, 1,2,3,4-tetrahydroisoquinolinotriethoxysilane, and octamethyleneiminotriethoxysilane.

The ether to be used as the external electron donor (C) is preferably a cyclic ether compounds. The cyclic ether compound refers to any heterocyclic compound having at least one —C—O—C— bond in its ring structure. Cyclic ether compounds having at least one —C—O—C—O—C— bond in the ring structure are more preferable, and 1,3-dioxolane and 1,3-dioxane are particularly preferable.

The external electron donor (C) may be used alone, or two or more compounds may be used in combination as the external electron donor (C).

The process for bringing the solid catalyst component (A), the organoaluminum compound (B), and, optionally, the external electron donor (C) into contact with each other is not particularly limited so long as the solid catalyst for olefin polymerization can be produced. They are brought into contact with each other in the presence or absence of a solvent. A mixture obtained by the contact may be added to a polymerization zone; the individual components may be added separately to a polymerization zone, thereby bringing them into contact with each other in the polymerization zone; or a mixture obtained by bringing any two components into contact with each other and the other component may be added separately to a polymerization zone, thereby bringing them into contact with each other in the polymerization zone.

Examples of the olefin to be used in the process of the present invention for producing an olefin polymer include ethylene, and α-olefins having 3 or more carbon atoms. Examples of the α-olefin include linear monoolefins such as propylene, 1-butene, 1-pentene, 1-hexene, 1-heptene, 1-octene and 1-decene; branched monoolefins such as 3-methyl-1-butene, 3-methyl-1-pentene and 4-methyl-1-pentene; cyclic monoolefins such as vinylcyclohexane; and combinations of two or more kinds thereof. Two or more α-olefins may be used in combination. Homopolymers of ethylene or propylene, and copolymers of multiple kinds of olefins containing ethylene or propylene as a main component are preferable. The combination of two or more olefins may include combinations of an olefins and and a compound having multiple unsaturated bonds such as a conjugated diene or a nonconjugated diene.

Preferable examples of the olefin polymer to be produced in the process of the present invention for producing an olefin polymer include an ethylene homopolymer, a propylene homopolymer, a 1-butene homopolymer, a 1-pentene homopolymer, a 1-hexene homopolymer, an ethylene-propylene copolymer, an ethylene-1-butene copolymer, an ethylene-1-hexene copolymer, a propylene-1-butene copolymer, a propylene-1-hexene copolymer, an ethylene-propylene-1-butene copolymer, an ethylene-propylene-1-hexene copolymer, and polymers obtained by multistage polymerization thereof.

The solid catalyst of the present invention for olefin polymerization may be preferably produced by the process including the following steps: (i) a step of polymerizing a small amount of an olefin, which is the same as or different from the olefin to be used in the main polymerization stage, which is usually referred to as main polymerization, in the presence of the solid catalyst component (A) or the solid catalyst component (A') and the organoaluminum compound (B) (in order to control the molecular weight of the olefin polymer to be produced, a chain transfer agent such as hydrogen may be used, or an external electron donor (C) may be used), whereby a catalyst component whose surface is covered with the olefin polymer is produced, wherein the polymerization is usually referred to as "prepolymerization," and accordingly the obtained catalyst component is usually referred to as a "prepolymerized catalyst component", and (ii) a step of bringing the prepolymerized catalyst component, the organoaluminum compound (B), and the external electron donor (C) into contact with each other.

The prepolymerization is preferably slurry polymerization using an inert hydrocarbon such as propane, butane, isobutane, pentane, isopentane, hexane, heptane, octane, cyclohexane, benzene or toluene as a solvent.

The organoaluminum compound (B) is used in step (i) in an amount of usually 0.5 mol to 700 mol, preferably 0.8 mol to 500 mol, particularly preferably 1 mol to 200 mol per mole of the titanium atoms in the solid catalyst component (A) to be used in step (i).

The olefin to be prepolymerized is used in an amount of usually 0.01 g to 1000 g, preferably 0.05 g to 500 g, particularly preferably 0.1 g to 200 g per gram of the solid catalyst component to be used in step (i).

In the slurry polymerization of step (i), the slurry of the solid catalyst component has a concentration of preferably 1 to 500 g of the solid catalyst component per liter of the solvent, particularly preferably 3 to 300 g of the solid catalyst component per liter of the solvent.

The prepolymerization temperature is preferably from −20° C. to 100° C., particularly preferably from 0° C. to 80° C. In the prepolymerization, the partial pressure of the olefin in the gas phase is preferably from 0.01 MPa to 2 MPa, particularly preferably from 0.1 MPa to 1 MPa, except for olefins which are liquid at the prepolymerization pressure or temperature. The prepolymerization time is preferably from 2 minutes to 15 hours.

In the prepolymerization, examples of the process of adding the solid catalyst component, the organoaluminum compound (B) and the olefin to a polymerization zone include the following processes (1) and (2):
(1) a process in which the solid catalyst component and the organoaluminum compound (B) are added to a polymerization zone, and then the olefin is added thereto; and
(2) a process in which the solid catalyst component and the olefin are added to a polymerization zone, and then the organoaluminum compound (B) is added thereto.

In the prepolymerization, examples of the process of adding the olefin to a polymerization zone include the following processes (1) and (2):
(1) a process in which an olefin is sequentially added to a polymerization zone so that an inner pressure of the polymerization zone can be kept at a prescribed level; and
(2) a process in which a prescribed amount of an olefin is added to a polymerization zone at once.

In the prepolymerization, the external electron donor (C) is used in an amount of usually 0.01 mol to 400 mol, preferably 0.02 mol to 200 mol, particularly preferably 0.03 mol to 100 mol per mole of the titanium atoms contained in the solid catalyst component (A), and usually 0.003 mol to 5 mol, preferably 0.005 mol to 3 mol, particularly preferably 0.01 mol to 2 mol per mole of the organoaluminum compound (B).

In the prepolymerization, examples of the process of adding the external electron donor (C) to a polymerization zone include the following processes (1) and (2):
(1) a process in which an external electron donor (C) is added to a polymerization zone alone; and
(2) a process in which a mixture obtained by the bringing an external electron donor (C) and an organoaluminum compound (B) into contact with each other is added to a polymerization zone.

In the main polymerization, the organoaluminum compound (B) is used in an amount of usually 1 mol to 1000 mol, particularly preferably 5 mol to 600 mol per mole of the titanium atoms in the solid catalyst component (A).

In the main polymerization, when the external electron donor (C) is used, the external electron donor (C) is used in an amount of usually 0.1 mol to 2000 mol, preferably 0.3 mol to 1000 mol, particularly preferably 0.5 mol to 800 mol per mole of the titanium atoms contained in the solid catalyst component (A), and usually 0.001 mol to 5 mol, preferably 0.005 mol to 3 mol, particularly preferably 0.01 mol to 1 mol per mole of the organoaluminum compound (B).

In the main polymerization, the polymerization temperature is usually from −30° C. to 300° C., preferably from 20° C. to 180° C. The polymerization pressure is not particularly limited, and it is usually from an ordinary pressure to 10 MPa, preferably from about 200 kPa to about 5 MPa because these pressures are industrially and economically advantageous. The polymerization may be either batch polymerization or continuous polymerization. Examples of the polymerization process include a slurry polymerization process and a solution polymerization process, in which an inactive hydrocarbon such as propane, butane, isobutane, pentane, hexane, heptane and octane is used as a solvent; a bulk polymerization process in which an olefin that is liquid at the polymerization temperature is used as a medium; and a gas phase polymerization process.

In order to control the molecular weight of a polymer resulting from the main polymerization, a chain transfer agent, e.g., hydrogen, or an alkyl zinc such as dimethyl zinc or diethyl zinc may be used.

According to the present invention, a solid catalyst for olefin polymerization being capable of providing a polymer having high stereoregularity when an α-olefin is polymerized, and a solid catalyst component for olefin polymerization, which is used for producing the solid catalyst, can be obtained. When an olefin is polymerized using the solid catalyst, an olefin polymer having high stereoregularity can be obtained. The solid catalyst component of the present invention is particularly preferable as a catalyst for producing an isotactic stereoregular α-olefin polymer.

As a measure of isotactic stereoregularity, an isotactic pentad fraction may be used. When the α-olefin is propylene, the isotactic pentad fraction here is a fraction of propylene monomer units existing at the center of an isotactic linkage expressed in pentad unit in crystalline polypropylene molecular chains, in other words, a linkage consisting of five propylene monomer units continuously meso-bonded to each other, which can be measured by using $^{13}$C-NMR in accordance with the process described in A. Zambelli et al., Macromolecules, 1973, 6, pp. 925 to 926. The assignment of NMR absorption peak may be based on the description of Macromolecules, 1975, 8, pp. 687 to 689. The isotactic pentad fraction may be abbreviated as [mmmm]. The theoretical upper limit of mmmm is 1.000. The solid catalyst of the present invention is preferable as a solid catalyst for producing an isotactic stereoregular α-olefin polymer having an mmmm of 0.900 or more, more preferably 0.940 or more, further preferably 0.950 or more.

In the following, the present invention will be explained in more detail by way of examples and comparative examples.
[Analysis of Catalyst]
A composition analysis of a solid catalyst component was performed as follows.

With respect to the content of titanium atoms, about 20 mg of a solid sample was decomposed in about 30 ml of a 2 N diluted sulfuric acid. 3 ml of a 3% by weight aqueous hydrogen peroxide solution was added thereto, characteristic absorption at 410 nm of the obtained liquid sample was measured using a double beam spectrophotometer U-2001 manufactured by Hitachi, Ltd, and the content of titanium atoms was determined on the basis of a calibration curve produced in advance. With respect to the content of alkoxy groups, about 2 g of a solid sample was decomposed in 100 ml of water, then an amount of an alcohol corresponding to alkoxy groups in the obtained liquid sample was determined internal standard gas chromatography, and the obtained amount of the alcohol was converted to the content of alkoxy groups. With respect to the content of internal donor compounds, about 300 mg of a solid catalyst component was dissolved in 100 ml of N,N-dimethylacetamide, and then the content of internal donor compounds in the solution was determined by internal standard gas chromatography.

[Analysis of Polymer]

(1) Amount of Xylene-Soluble Component (CXS: Unit=% by Weight)

The amount of components, soluble in xylene at 20° C. of an olefin polymer (hereinafter referred to as CXS) was measured as follows. In 200 ml of boiling xylene was dissolved 1 g of the polymer, and the temperature of the mixture was gradually decreased to 50° C. Then the mixture was immersed in ice water and stirred to cool to 20° C., and was allowed to stand at 20° C. for 3 hours, and then a precipitated polymer was collected by filtration. The percentage by weight of the polymer remaining in the filtrate was expressed as CXS.

(2) Intrinsic Viscosity ([η]: Unit: dl/g)

The intrinsic viscosity (hereinafter referred to as [η]) of an olefin polymer was measured at 135° C. in tetralin.

(3) Isotactic Pentad Fraction ([mmmm])

In a 10 mmϕ test tube, about 200 mg of a polymer was dissolved in 3 ml of ortho-dichlorobenzene to prepare a sample, and the sample was measured by $^{13}$C-NMR. The measurement conditions by $^{13}$C-NMR are shown below.
Measurement Temperature: 135° C.;
Pulse Repetition Time: 10 seconds;
Pulse Width: 45°;
Cumulated Number: 2500 times;

The isotactic pentad fraction was calculated from the measurement result in accordance with the process described above.

Example 1

(1) Synthesis of Solid Catalyst Component (A)

Step (1-1A): After the atmosphere in a 200 ml-flask equipped with a stirrer, a dropping funnel and a thermometer was replaced by nitrogen, 5.11 g of diethoxymagnesium and 40.9 ml of toluene were added to the flask. Then, 10.2 ml (2 ml/g of the magnesium compound) of titanium tetrachloride, and 1.53 ml (0.3 ml/g of the magnesium compound) of 3-ethoxy-2-tert-butylpropionyl chloride were added to the flask at room temperature. After that, the temperature in the flask was elevated to 110° C., and the components in the flask were stirred at the same temperature for 3 hours. Next, solid-liquid separation of the stirred mixture was performed to give a solid. The solid was washed with 51 ml of toluene three times at 100° C.

Step (1-1B): To the washed solid was added 40.9 ml of toluene to form a slurry. To the slurry was added 10.2 ml (2 ml/g of the magnesium compound) of titanium tetrachloride to form a mixture, and the mixture was stirred at 110° C. for 1 hour. After that, solid-liquid separation of the stirred mixture was performed to form a solid. The solid was washed with 51 ml of toluene three times at 100° C., and additionally with 51 ml of hexane three times at room temperature. The washed solid was dried under reduced pressure, so that a solid catalyst component (A) was obtained. The results of the analysis of the solid catalyst component are shown in Table 1.

(3) Polymerization of Propylene

A 3-liter stainless steel autoclave equipped with an agitator was dried under reduced pressure, and then was purged with argon gas. The autoclave was cooled, and then evacuated. To the autoclave were added 2.63 mmol of triethyl aluminum (an organoaluminum compound), 0.26 mmol of cyclohexylethyldimethoxysilane (an external electron donor), and 1.59 mg of the solid catalyst component for olefin polymerization (A) synthesized in Example 1 (1). Subsequently, 780 g of propylene and 0.2 MPa of hydrogen were added to the autoclave. The temperature of the autoclave was elevated to 80° C., and propylene was polymerized at 80° C. for 1 hour. After the polymerization reaction was finished, unreacted monomers were purged to obtain a polymer. The polymer was dried at 60° C. for one hour under reduced pressure, thereby obtaining 105 g of a propylene homopolymer powder. The polymerization activity, which is expressed by the amount of the polymer produced per gram of the catalyst was 66,300 g-PP/g-solid catalyst component. The polymer had a CXS of 1.2% by weight, an [η] of 1.05 dl/g, and an [mmmm] of 0.976. The obtained results are shown in Table 1.

Comparative Example 1

(1) Synthesis of Solid Catalyst Component (A)

Step (1-1A): The same procedure as in Example 1 (1) was performed, except that ethyl 3-ethoxy-2-tert-butylpropionate was used instead of 3-ethoxy-2-tert-butylpropionyl chloride.
Step (1-1B): The same procedure as in Example 1 (1) was performed, so that a solid catalyst component (A) was obtained. The results of the analysis of the solid catalyst component are shown in Table 1.

(2) Polymerization of Propylene

The same procedure as in Example 1 (2) was performed, except that 5.79 mg of the solid catalyst component (A) synthesized in Comparative Example 1 (1) was used as the solid catalyst component, so that 311 g of a propylene polymer was obtained. The polymerization activity was 53,700 g-PP/g-solid catalyst component. The obtained polymer had a CXS of 1.1% by weight, an [η] of 1.09 dl/g, and an [mmmm] of 0.973. The obtained results are shown in Table 1.

Example 2

(1) Synthesis of Solid Catalyst Component (A')

Step (1-1A): After the atmosphere in a 200 ml-flask equipped with a stirrer, a chopping funnel and a thermometer was replaced by nitrogen, 5.17 g of diethoxymagnesium and 41.4 ml of toluene were added to the flask. Then, 10.3 ml (2 ml/g of the magnesium compound) of titanium tetrachloride and 1.55 ml (0.3 ml/g of the magnesium compound) of 3-ethoxy-2-tert-butylpropionyl chloride were added to the flask at room temperature. After that, the temperature in the flask was elevated to 110° C., and the components in the flask were stirred at that temperature for 3 hours. Next, solid-liquid separation of the stirred mixture was performed to give a solid. The solid was washed with 52 ml of toluene three times at 100° C.
Step (1-1B): To the washed solid was added 41.4 ml of toluene to form a slurry. To the slurry were added 10.3 ml (2 ml/g of the magnesium compound) of titanium tetrachloride and 0.26 ml (0.05 ml/g of the magnesium compound) of ethyl 3-ethoxy-2-tert-butylpropionate to form a mixture, and the mixture was stirred at 110° C. for 1 hour. After that, solid-liquid separation of the stirred mixture was performed, and the solid was washed with 52 ml of toluene three times at 100° C., and additionally with 52 ml of hexane three times at room temperature. The washed solid was dried under reduced pressure, so that a solid catalyst component for olefin polymerization (A') was obtained. The results of the analysis of the solid catalyst component are shown in Table 1.

(2) Polymerization of Propylene

The same procedure as in Example 1 (2) was performed, except that 4.28 mg of the solid catalyst component (A') synthesized in Example 3 (1) was used as the solid catalyst component, so that 197 g of a propylene polymer was obtained. The polymerization activity was 46,000 g-PP/g-solid catalyst component. The obtained polymer had a CXS of 0.8% by weight, an [η] of 1.15 dl/g, and an [mmmm] of 0.979. The obtained results are shown in Table 1.

TABLE 1

| | | Synthesis conditions for solid catalyst component | | | | Content of solid catalyst component | | | Polymerization results | | | |
|---|---|---|---|---|---|---|---|---|---|---|---|---|
| | | Internal electron donor | | Halogenated metal compound | | Content of titanium | Content of ethoxy | Content of internal electron donor B | Polymerization activity g-PP/g-solid | CXS | | |
| | | Kind | Addition amount | Kind | Addition amount | atoms % by weight | groups % by weight | % by weight | catalyst component | % by weight | [η] dl/g | [mmmm] |
| Example 1 | Step (1-1 A) | A | 0.30 | Titanium tetrachloride | 2.0 | 2.56 | 0.57 | 10.0 | 66,300 | 1.2 | 1.05 | 0.976 |
| | Step (1-1 B) | — | — | Titanium tetrachloride | 2.0 | | | | | | | |
| Comparative Example 1 | Step (1-1 A) | B | 0.30 | Titanium tetrachloride | 2.0 | 2.83 | 0.67 | 10.6 | 53,700 | 1.1 | 1.09 | 0.973 |
| | Step (1-1 B) | — | — | Titanium tetrachloride | 2.0 | | | | | | | |
| Example 2 | Step (1-1 A) | A | 0.30 | Titanium tetrachloride | 2.0 | 1.94 | 0.47 | 11.8 | 51,900 | 0.9 | 1.04 | 0.977 |
| | Step (1-1 B) | B | 0.05 | Titanium tetrachloride | 2.0 | | | | | | | |
| Example 3 | Step (1-1 A) | A | 0.30 | Titanium tetrachloride | 2.0 | 1.75 | 0.42 | 12.2 | 46,000 | 0.8 | 1.15 | 0.979 |
| | Step (1-1 B) | B | 0.10 | Titanium tetrachloride | 2.0 | | | | | | | |

Addition amount unit: ml/g of magnesium compound (b)
A = 3-ethoxy-2-tert-butylpropionyl chloride
B = ethyl 3-ethoxy-2-tert-butylpropionate (2) Polymerization of Propylene The same procedure as in Example 1 (2) was performed, except that 4.70 mg of the solid catalyst component (A') synthesized in Example 2 (1) was used as the solid catalyst component, so that 244 g of a propylene polymer was obtained. The polymerization activity was 51,900 g-PP/g-solid catalyst component. The obtained polymer had a CXS of 0.9% by weight, an [η] of 1.04 dl/g, and an [mmmm] of 0.977. The obtained results are shown in Table 1.

Example 3

(1) Synthesis of Solid Catalyst Component (A')

Step (1-1A): The same procedure as in Example 2 (1) was performed.
Step (1-1B): The same procedure as in Example 2 (1) was performed, except that ethyl 3-ethoxy-2-tert-butylpropionate was used in an amount of 0.10 ml/g of the magnesium compound. The results of the analysis of the solid catalyst component for olefin polymerization are shown in Table 1.

The invention claimed is:

1. A process for producing a solid catalyst component (A) for olefin polymerization, the process comprising a step of bringing a titanium compound (a), a magnesium compound (b) and an internal electron donor represented by Formula (I) into contact with each other,

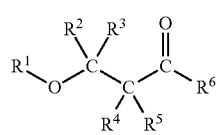

(I)

where $R^1$ is a hydrocarbyl group having 1 to 20 carbon atoms; $R^2$, $R^3$, $R^4$ and $R^5$ are each independently selected from a hydrogen atom, a halogen atom and a hydrocarbyl group having 1 to 20 carbon atoms, and at least one selected from $R^2$, $R^3$, $R^4$ and $R^5$ is a hydrocarbyl group having 1 to 20 carbon atoms; $R^6$ is a halogen atom.

2. A process for producing a solid catalyst component (A') for olefin polymerization, the process comprising a step of bringing a titanium compound (a), a magnesium compound (b) and an internal electron donor represented by Formula (I) into contact with each other to form a mixture, and

where $R^1$ is a hydrocarbyl group having 1 to 20 carbon atoms; $R^2$, $R^3$, $R^4$ and $R^5$ are each independently selected from a hydrogen atom, a halogen atom and a hydrocarbyl group having 1 to 20 carbon atoms, and at least one selected from $R^2$, $R^3$, $R^4$ and $R^5$ is a hydrocarbyl group having 1 to 20 carbon atoms; $R^6$ is a halogen atom, a step of bringing an internal electron donor represented by Formula (II) into contact with the mixture,

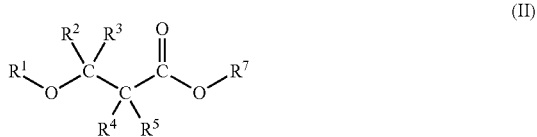

where $R^1$ and $R^7$ are each independently a hydrocarbyl group having 1 to 20 carbon atoms; $R^2$, $R^3$, $R^4$ and $R^5$ are each independently selected from a hydrogen atom, a halogen atom and a hydrocarbyl group having 1 to 20 carbon atoms, and at least one selected from $R^2$, $R^3$, $R^4$ and $R^5$ is a hydrocarbyl group having 1 to 20 carbon atoms.

3. The process according to claim 1, wherein $R^2$ and $R^3$ are hydrogen atoms.

4. The process according to claim 1, wherein the magnesium compound (b) is a halogenated magnesium (b-1).

5. The process according to claim 1, wherein the magnesium compound (b) is a dialkoxy magnesium (b-2).

6. The process according to claim 1, wherein $R^4$ is an alkyl group having 1 to 20 carbon atoms or an aryl group having 6 to 20 carbon atoms.

7. The process according to claim 6, wherein $R^4$ is a branched or a cyclic alkyl group having 3 to 20 carbon atoms, or an aryl group having 6 to 20 carbon atoms.

8. A process for producing a solid catalyst for olefin polymerization, the process comprising a step of bringing the solid catalyst component (A) produced by the process according to claim 1 into contact with an organoaluminum compound (B).

9. A process for producing a solid catalyst for olefin polymerization, the process comprising a step of bringing the solid catalyst component (A) produced by the process according to claim 1, an organoaluminum compound (B) and an external electron donor (C) into contact with each other.

10. A process for producing an olefin polymer, the process comprising a step of polymerizing an olefin in the presence of a solid catalyst produced by the process according to claim 8.

11. A process for producing an olefin polymer, the process comprising a step of polymerizing an olefin in the presence of a solid catalyst produced by the process according to claim 9.

12. The process according to claim 10, wherein the olefin is an α-olefin having 3 to 20 carbon atoms.

13. The process according to claim 11, wherein the olefin is an α-olefin having 3 to 20 carbon atoms.

14. The process according to claim 2, wherein $R^2$ and $R^3$ are hydrogen atoms.

15. The process according to claim 2, wherein the magnesium compound (b) is a halogenated magnesium (b-1).

16. The process according to claim 2, wherein the magnesium compound (b) is a dialkoxy magnesium (b-2).

17. The process according to claim 2, wherein $R^4$ is an alkyl group having 1 to 20 carbon atoms or an aryl group having 6 to 20 carbon atoms.

18. A process for producing a solid catalyst for olefin polymerization, the process comprising a step of bringing the solid catalyst component (A') produced by the process according to claim 2 into contact with an organoaluminum compound (B).

19. A process for producing a solid catalyst for olefin polymerization, the process comprising a step of bringing the solid catalyst component (A') produced by the process according to claim 2, an organoaluminum compound (B) and an external electron donor (C) into contact with each other.

* * * * *